(12) United States Patent
Smrček et al.

(10) Patent No.: US 7,297,909 B2
(45) Date of Patent: Nov. 20, 2007

(54) METHOD AND APPARATUS FOR HOMOGENISATION OF MELT

(75) Inventors: Josef Smrček, Praha (CZ); Milan Hájek, Praha (CZ); Peter Vilk, Goring on Thames (GB)

(73) Assignee: BH-F (Engineering) Ltd., Didcot, Oxon (GB)

( * ) Notice: Subject to any disclaimer, the term of this patent is extended or adjusted under 35 U.S.C. 154(b) by 0 days.

(21) Appl. No.: 10/495,461

(22) PCT Filed: Nov. 15, 2002

(86) PCT No.: PCT/CZ02/00063

§ 371 (c)(1), (2), (4) Date: May 13, 2004

(87) PCT Pub. No.: WO03/042119

PCT Pub. Date: May 22, 2003

(65) Prior Publication Data

US 2005/0082282 A1   Apr. 21, 2005

(30) Foreign Application Priority Data

Nov. 16, 2001   (CZ) .................. 2001-4128

(51) Int. Cl.
*H05B 6/80* (2006.01)
*C03B 5/183* (2006.01)

(52) U.S. Cl. ............... 219/679; 219/687; 219/746; 219/756; 373/27; 65/135.6

(58) Field of Classification Search ........ 219/678–679, 219/687–688, 756, 762, 746; 65/134.1–135.1, 65/135.6; 373/27
See application file for complete search history.

(56) References Cited

U.S. PATENT DOCUMENTS

| 3,205,292 | A | | 9/1965 | Descarsin |
| 3,765,853 | A | * | 10/1973 | Riebling .................. 65/21.3 |
| 6,436,859 | B1 | * | 8/2002 | Muramoto et al. .......... 501/69 |
| 6,909,075 | B2 | * | 6/2005 | Jakes et al. ............... 219/701 |
| 2004/0099010 | A1 | * | 5/2004 | Johannsson ............... 65/135.6 |

FOREIGN PATENT DOCUMENTS

| GB | 2 122 859 | * | 1/1984 |
| JP | 59-151797 | * | 8/1984 |
| WO | 00/78684 | | 12/2000 |

* cited by examiner

*Primary Examiner*—Philip H. Leung
(74) *Attorney, Agent, or Firm*—Dykema Gossett PLLC

(57) ABSTRACT

Microwave radiation of frequency 0.1 to 20 GHz, is applied to the melt of viscosity in the range $10^4$ to $10^1$ Pa·s. The outside surface of heated space, where an outlet of the waveguide of microwave radiation is located, can be cooled. The microwave radiation in the melt may be reflected by the reflective metallic elements in the melt back to the place of radiation entry into the melt and shielded from the surroundings by a shielding metallic element. An outlet is provided of at least one waveguide from the source of the microwave radiation, in any direction to the outside surface of the melt, into the space with the melt of a given viscosity. At least one waveguide is led, for example, to the outside surface of the bottom of the channel of the forehearth.

10 Claims, 3 Drawing Sheets

METHOD AND APPARATUS FOR HOMOGENISATION OF MELT

BACKGROUND OF INVENTION a. Field of Invention

The invention is related to a method of homogenizing of melt, dielectric type, e.g. glass, by removing or minimizing local concentration differences, i.e. inhomogeneities in the melt, and an apparatus for performing of this method.

b. Description of Related Art

Traditional methods—insertion of gas-generating elements into the molten glass, when the gas bubbles are rising to the surface and thus mixing the content of the bath, are still being used for achieving homogenous melt, for example of glass.

Modern method of homogenizing is mechanical stirring by rotating stirrers. With regard to strictly laminar flow it causes only elongation of cords. The main disadvantage of mechanical rotation stirring is, that the stirrer action does not reach to the bottom, where the cords are located. It is not possible to lower the stirrer to the level of cords, i.e. 1 mm above the bottom.

Inhomogeneities of the melt, mainly in molten glass, are present mainly as cords, i.e. parts of melt in the shape of thin layers or cords of thickness 0.001-1 mm, that is in dimensions, which cause diffusion of visible light. Glassmelt with cords has different chemical composition and thus also different physical properties:

refractive index, then the cords are visible in the glass and visually disturbing, increasing diffusion of light and thus reduce spectral transmissivity, reduce brilliancy of the glass;

thermal expansion, which reduces strength of the product, viscosity and surface tension, which have an influence on cord reduction through these properties having an adverse effect in the forming process;

and cords usually also have higher specific density. i.e. they are concentrated on the bottom and there, they create a thick cords, which are especially dangerous in final products.

Description of microwave heating, in such manner that an inert additive chosen from the group of carbides, borides or nitrides is added to glass material mixture in the quantity 5 to 50 g to 1 kg of glass material, which is melted using microwave radiation of frequency 2450 MHz, is provided in Czech patents No. 289191 and No. 289193. The device consists of a microwave furnace with at least one generator. It is a modern method of glass material melting from cold conditions, i.e. of glass bath using microwave energy heating.

An additive agent—additive needs to be used for melting the glass.

The purpose of the present invention is homogenization of already melted glass, with a melt viscosity higher than that in the melting area, without the additive.

SUMMARY OF THE INVENTION

This goal will be reached by a new method of homogenizing of melt, preferably glass, homogenizing in the space of refractory channel of a forehearth, possibly in refractory basin the working end, where the melt viscosity is always higher than in the melting area, according this invention, basis of which lay in application of microwave radiation of frequency 0.1 to 20 GHz, from any direction, i.e. from top, bottom or side of the melt containing space, or in combination of all of these direction, on dielectric melt of viscosity in the range $10^4$ to $10^1$ Pa·s., in stationary or flowing state.

The main advantage of this new method of melt homogenizing is enabling homogenization of otherwise difficult to homogenize melt on the bottom or melt with very high viscosity.

When the outside of the melt containing space, where microwave radiation waveguide outlet is located, is being cooled, a favorable high ratio of melt permitivity to refractory brickwork permitivity, is reached.

Microwave radiation in the melt and also outside the melt can be reflected and directed by reflective metallic elements in the melt back to the place of its entry into the melt, which increases the share of absorbed energy in the bottom part of the melt, where non-homogenized melt is usually located, and the top part of melt is not unnecessarily over-heated by redundant energy.

Microwave radiation in the melt and outside the melt is shielded from the surrounding by shielding metallic element with the purpose of microwave field concentration on the melt and preventing escape of microwave radiation into surrounding.

For performing of this new method of homogenization already melted material serves according a apparatus per this invention, the principle of which lays in at least one outlet of microwave radiation source waveguide in any direction, that is to outside surface of the melt, i.e. for example bottom and/or side walls of the space and/or above the melt surface, into the space with the melt of viscosity in the range $10^4$ to $10^1$ Pa·s., e.g. in the refractory channel of a forehearth or basin of the working end. At least one waveguide can be led to the outside surface of forehearth channel bottom, possibly to outside surface of forehearth channel metallic casing or to outside surface of forehearth channel bottom, or to side forehearth walls of the working end, or from the top, by positioning the waveguide above the surface or above the covering or roof plate.

The main advantage of this design is that the supplied microwave energy is directed to the melt by the most direct way in the environment with low permittivity and without elements reducing effectiveness of this transmission being in the way.

When cooling elements, e.g. cooling air, are introduced to the place of waveguide outlet into the space with melt, the temperature of refractory wall is reduced and thus also its permittivity and the ratio of melt and wall permittivity increases, which improves the ratio of the energy in the melt to the energy lost in the wall.

If the place of waveguide outlet is equipped with suitable insulating layer, it is possible to also use ceramic materials sensitive to cooling.

Shielded reflective metallic elements, e.g. molybdenum rods, which reflect and concentrate the microwave energy back to the bottom of the melt and thus increase concentration of energy in the bottom part of the melt, are built in the space with the melt in convenient arrangement.

Metallic casing of the refractory forehearth or of the basin working end serves as part of the shielding.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
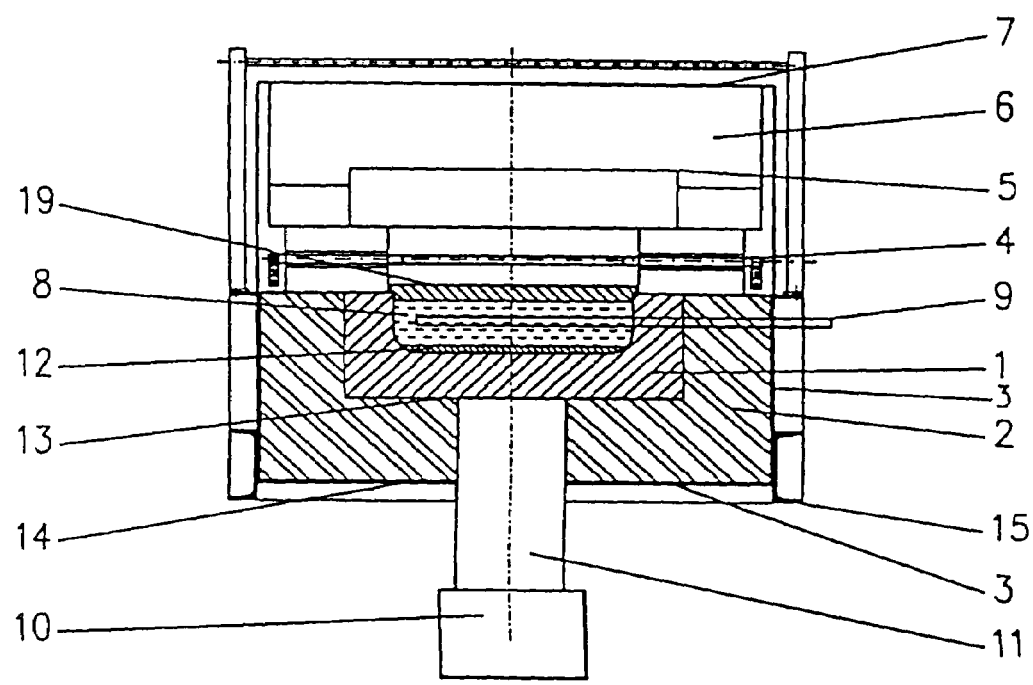
FIG. 1—vertical section through a forehearth channel with melt and source of microwave energy mounted from the bottom, FIG. 2—vertical section through a forehearth channel with melt and sources of microwave energy mounted from the bottom and top.
Figure 2:
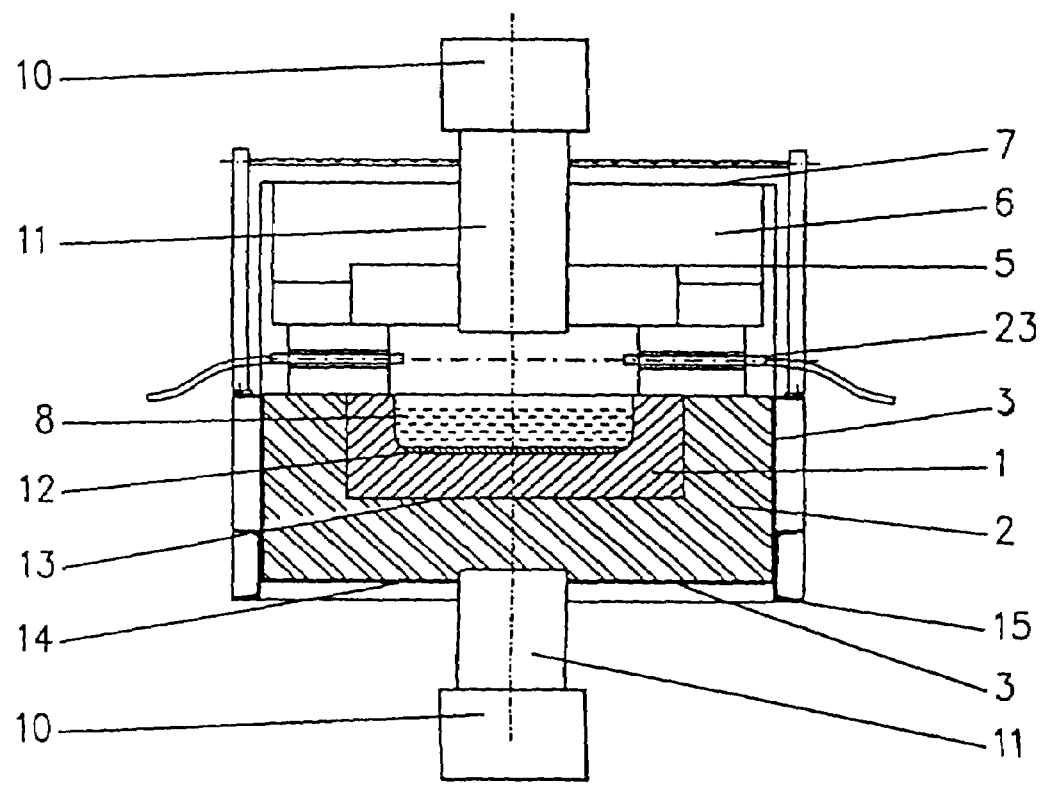
Figure 3:
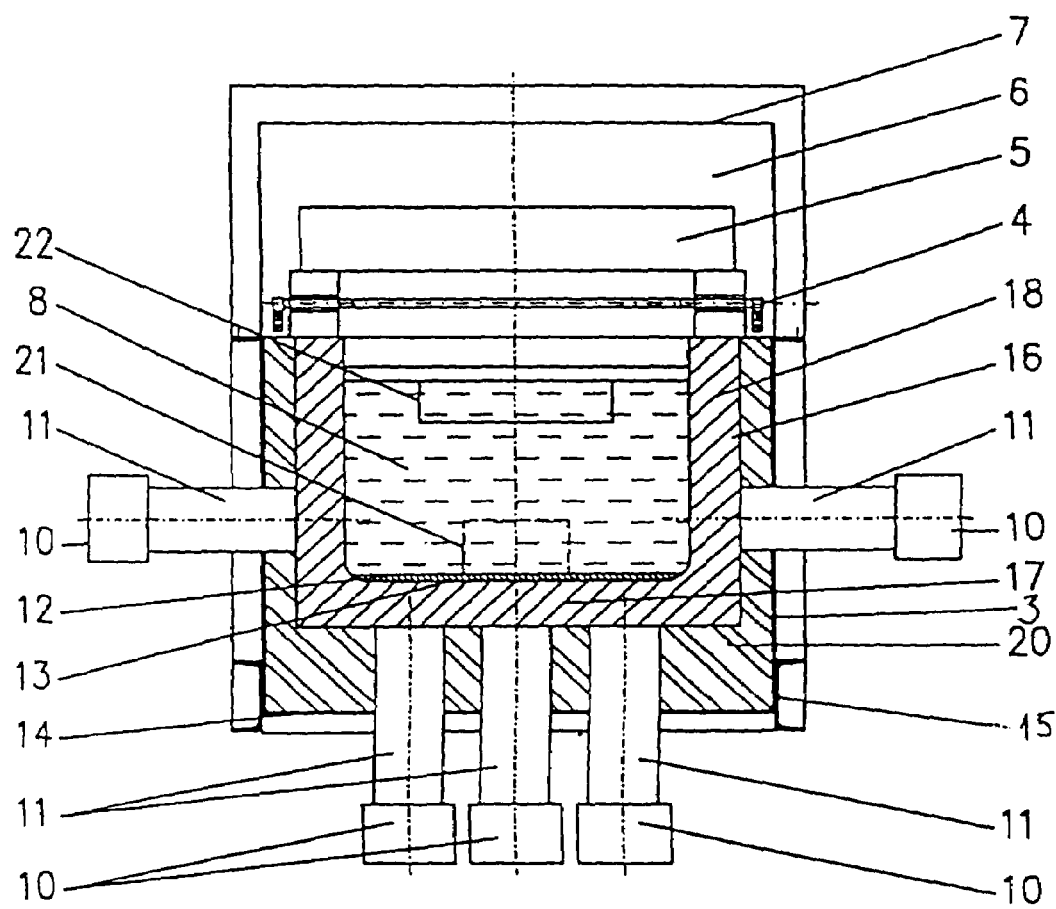
FIG. 3—vertical section through the working end with melt; microwave energy sources mounted from the bottom and side of the basin.

Referring now to the drawings wherein like reference numerals designate corresponding parts throughout the several views, FIGS. 1-3 illustrate various components for a method and apparatus for homogenizing of melt according to the present invention.

Example 1

FIG. 1

Refractory channel 1 of the forehearth has a rectangular section in vertical section perpendicular to longitudinal axis of the channel 1. Dielectric melt, e.g. glass melt 8, flows thorough the channel 1. The channel 1 is surrounded by thermal insulation 2 in the steel casing 3. The channel 1 is heated above the glass melt 8 by electric resistance elements 4 or non-showed burners in the same locations. The channel 1 is covered above the surface of the molten glass 8 by a roof 5, covered by top insulation 6. The surface of glass is covered by submerged surface plate 19. The top construction of the channel 1 is covered by shielding metallic sheet 7, connected with the metallic casing 6 in the channel 1. Metallic rods 9 e.g. molybdenum, are immersed in the molten glass 8. The microwave field is introduced into the molten glass 8 from the source 10 of microwave radiation by waveguide 11 positioned at the bottom of the channel 1 and passing through the opening in the metallic casing 3, bottom insulation 2 to the outside surface of the bottom 13 of the channel 1.

The molten glass 8 has viscosity in the range $10^4$ to $10^1$ Pa·s. and is being subjected to microwave radiation of frequency 0.1 to 20 GHz. The melt is e.g. borosilicate glass, which has viscosity up to $10^4$ Pa·s in the channel 1 of the forehearth, and is being subjected to radiation on frequency up to 2.45 GHz.

Microwaves of frequency 2.45 GHz enter from the waveguide 11 to the channel 1 of the forehearth. The waveguide 11 and in the location of the waveguide 11 the non insulated bottom of the channel 1 are being cooled by air. Thus, sufficiently low ratio of permitivity of refractory material of the channel 1 of the forehearth to the permitivity of the molten glass 8 is maintained. That is why the majority of the energy gets into molten glass 8. It enters the channel 1 through the bottom 13. Heavy corrosive melt 12, which is the source of the dangerous cords, is being accumulated on the bottom. This has the priority in heating, thus causes rise in temperature difference between the cords and base molten glass 8, this reduces viscosity of the cords, which are then being more easily stirred into the glass by convection flow and diffusion. This overheating is being helped to also by the installed metallic rods 9 in the molten glass 8, which reflect the microwave energy back to the bottom 13 of the channel 1. This again improves the ratio of absorbed energy in the cords and in the basic use high power output of microwave sources molten glass 8, so it is not necessary to 10. Position of the shielding sheet 7 changes the size of resonance spaces and thus the position of antinode loops and nodal points. Likewise the position of resistance heating elements 4 has an influence on reflection of microwaves back into the molten glass 8 and thus also shape of temperature field in the melt and necessary power input. If the horizontal heat elements 4 are wound sufficiently close, i.e. with distance less than ¼ of the wave length of used radiation, the reflection is almost perfect.

Quantity of wasted heat can be measured on the source of the microwave radiation, and per this quantity an optimum geometry of the height of the top reflective metallic element can be setup with relation to the level of the surface of melt and distance of waveguide outlet with regard to the outside wall of space with melt in such manner, that the quantity of the wasted heat on the source of the microwave radiation would be minimal.

With regards to the improvement of the homogeneity of the melt, e.g. molten glass 8, the following model measurement, simulating conditions in the channel 1 of the forehearth, were made. The microwaves, i.e. electromagnetic radiation of frequency 0.1 to 15 GHz pass through matters with low permitivity for electric polarization and permeability for magnetic polarization. Dielectric heating takes place in matters with high permitivity and should it be effecting the melt in closed reflective space, multiple standing waves of electric field are created. Thus antinode loops and nodal points are created in the space. When using the most frequently used frequency 2.45 GHz, the wave length is 12.2 cm. During this a non homogeneous electric field is created in the melt thanks to standing waves created by reflection from shielding reflective metallic case—temperature peaks with distance 2-4 cm are created due to exponential drop of absorbed output with distance from the beginning point of absorbing matter (melt)

due to non-homogeneous environment, i.e. the permitibility is not the same in all points due to different temperatures of the bath, uneven chemical composition;

due to reflective metallic or ceramic conductors. These reflect the energy back, so the absorption is few, times higher in the space between them and the wall.

Thus it is important to know the permitivity of the melt and its relation to temperature. Because at high temperatures of the melt measuring permitivity is complicated, method of measurement of absorbed energy in the measured sample of the melt is used. This is equal to speed of temperature change of the measured sample under usually met condition of constant specific heat. That is why an experiment of borosilicate glass melting in a pot in a microwave furnace was done. After heating 945 g of borosilicate glass with 4% mass of $Na_2O$ in the pot of 660 g weight to a temperature of 1255° C. and stabilization of temperature rise, at constant input of the furnace on 0.92 K. $sec^{-1}$, 14.7 g of glass gained by drainage of the producing furnace melting the basic glass, and representing corrosion melt 12—cords, was put into the glass in the pot. Thermal expansion of this corrosion melt 12—cords was significantly higher than that of the basic molten glass 8. The maximum size of the glass cullet of the corrosion melt 12 was 20 mm. After adjusting the temperature, i.e. after 10 minutes, temperature rise of 1.32 $Kmin^{-1}$ at constant power input and heat loss, was read for the period of 25 minutes. Then, in the course of 15 minutes, the temperature was increased to 1450° C., that is viscosity 310 Pa·s, and maintained on this value for the period of 30 minutes. After cooling the pot, no cords were seen in the glass, not even in polarized light.

Example 2

FIG. 2

In case the refractory channel 1 of the forehearth cannot be cooled, arrangement of the waveguides 11 per FIG. 2 is convenient, i.e. one waveguide 11 is positioned at the bottom 14 of the metallic casing 3 and one waveguide 11 is positioned above the surface of the molten glass 8. The bottom waveguide 11 passes through the bottom 14 of the metallic casing 3, possibly under its anchoring 15. The top waveguide 11 passes through the top shielding plate 7, top insulation 6 and roof 5. This design is suitable, if the refractory channel 1 of the forehearth is made of material with very low permitivity, e.g. $Al_2O_3$ or $SiO_2$ content. Introducing the microwave energy from the top, as is also designated in FIG. 2, is convenient mainly when using gas burners 23 for heating.

Example 3

FIG. 3

Molten glass 8 is entering through an throat 21 from the melting area of the furnace 5 into the furnace working end and exiting through an outlet 22 for further processing, e.g. into the refractory channel 1 of the forehearth.

The waveguides 11 are positioned to the outer surface of the refractory walls of the basin 16 of the working end containing molten glass 8. The basin 16, compared with the previous channel 1 of the forehearth, has larger depth and width. The basin 16, has rectangular section in a cross section perpendicular to its longitudinal axis. Large quantity of corrosive melt 12 is accumulated at the bottom 17 of the basin 16 of working end, which has to be homogenized with the base molten glass 8 in the basin 16. The waveguides 11 are positioned at the bottom 17 of the basin 16 of the working end and also at the side walls 18 of the basin 16. An advantage of microwave field effect on the corrosive melt 12 in the basin 16 and having insulation 20 is higher temperature and thus also higher permitivity of the glass. With regard to larger dimensions of the basin 16 of the working end of the furnace, it is convenient to use stronger microwave field and thus also larger quantity of waveguides 11. Metal casing 3 is used in this case as a border of resonating space.

This solution is intended mainly for larger widths of the basin 16 of the working end or if the permitivity of melts is low, then it is suitable to use frequency of microwave field lower than 2.45 GHz, e.g. frequency 0.915 GHz possibly 0.895 GHz.

The design per FIG. 3 is also suitable for viscosities of the molten glass 8 in the range 10 to 100 Pa·s, which is significantly lower viscosity and thus higher temperature, and it can be operated not only continually but also non-continually.

The design can be also applied in such manner, that not shown vertical rise channel with a rectangular section, height of which is larger than its width, is used instead of the basin 16. In this case the microwave field prevents the cords of corrosive melt 12 to separate to the bottom of the channel during melting, e.g. molten glass, rising.

INDUSTRIAL APPLICABILITY

The solution is intended for chemical homogenizing, possibly thermal homogenizing, of already molten materials, mainly molten glass 8, in glass feeders and working ends of furnaces. These melts can also be melts of thermoplastic inorganic materials.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

The invention claimed is:

1. An improved process of homogenizing of already molten material of dielectric type, the molten material including inhomogenities in the form of corrosion melt cords, the improved process comprising:
   introducing the molten material from a melting area of a furnace to a refractory channel of a forehearth or to a working end of the furnace;
   substantially shielding the molten material inside a shielded casing;
   exposing the molten material inside the shielded casing to microwave radiation passing through at least one waveguide, the microwave radiation being directed toward a lower part of the refractory channel or toward the working end of the furnace and having a frequency of 0.1 to 20 GHz, the molten material having a viscosity of $10^4$ to $10^1$ Pa·s;
   maintaining the viscosity value until dissolution of inhomogenities in the form of corrosion melt cords in the molten material is achieved; and
   insulating a waveguide outlet.

2. The improved process according to claim 1, further comprising reflecting the microwave radiation back to a place of entry into the molten material by reflective metallic elements placed in the molten material.

3. The improved process according to claim 1, wherein the dielectric type material is glass.

4. A glass furnace for homogenizing of already molten material of dielectric type received from a melting area of a furnace, the molten material including inhomogenities in the form of corrosion melt cords, said furnace comprising:
   a working end of the furnace and a refractory channel of a forehearth, each having a top part, a base and side walls;
   a shielding metallic casing with a bottom, lateral walls and a roof, the metallic casing covering the working end of the furnace and the refractory channel of forehearth;
   a heating element situated inside the casing above the top part of the working end of the furnace and the refractory channel of forehearth;
   an insulation disposed between the casing and the base and the side walls of the working end of the furnace and the refractory channel of forehearth; and
   at least one waveguide of a source of microwave radiation for dissolution of inhomogenities in the molten material, the waveguide having an inlet and an outlet, the waveguide being directed towards an inside of the working end of the furnace and the refractory channel of forehearth with the molten material having viscosity in a range of between approximately $10^4$ to $10^1$ Pa·s, and the waveguide outlet including an insulating layer.

5. The furnace according to claim 4, wherein the waveguide outlet is directed to the base of the working end of the furnace and the refractory channel of forehearth.

6. The furnace according to claim 4, wherein the waveguide is a source of microwave radiation the outlet of which is directed to the top part of the working end of the furnace and the refractory channel of forehearth.

7. The furnace according to claim 4, wherein the waveguide is a source of microwave radiation directed to the top part and base of the working end of the furnace and the refractory channel of forehearth.

8. The furnace according to claim 4, wherein a reflective metallic element is immersed inside the molten material.

9. The furnace according to claim 4, wherein the working end of the furnace and the refractory channel of forehearth include at least one of a square, rectangular, round and oval cross-section in a direction perpendicular to a longitudinal axis.

10. The furnace according to claim 4, wherein the dielectric type material is glass.

* * * * *